UNITED STATES PATENT OFFICE.

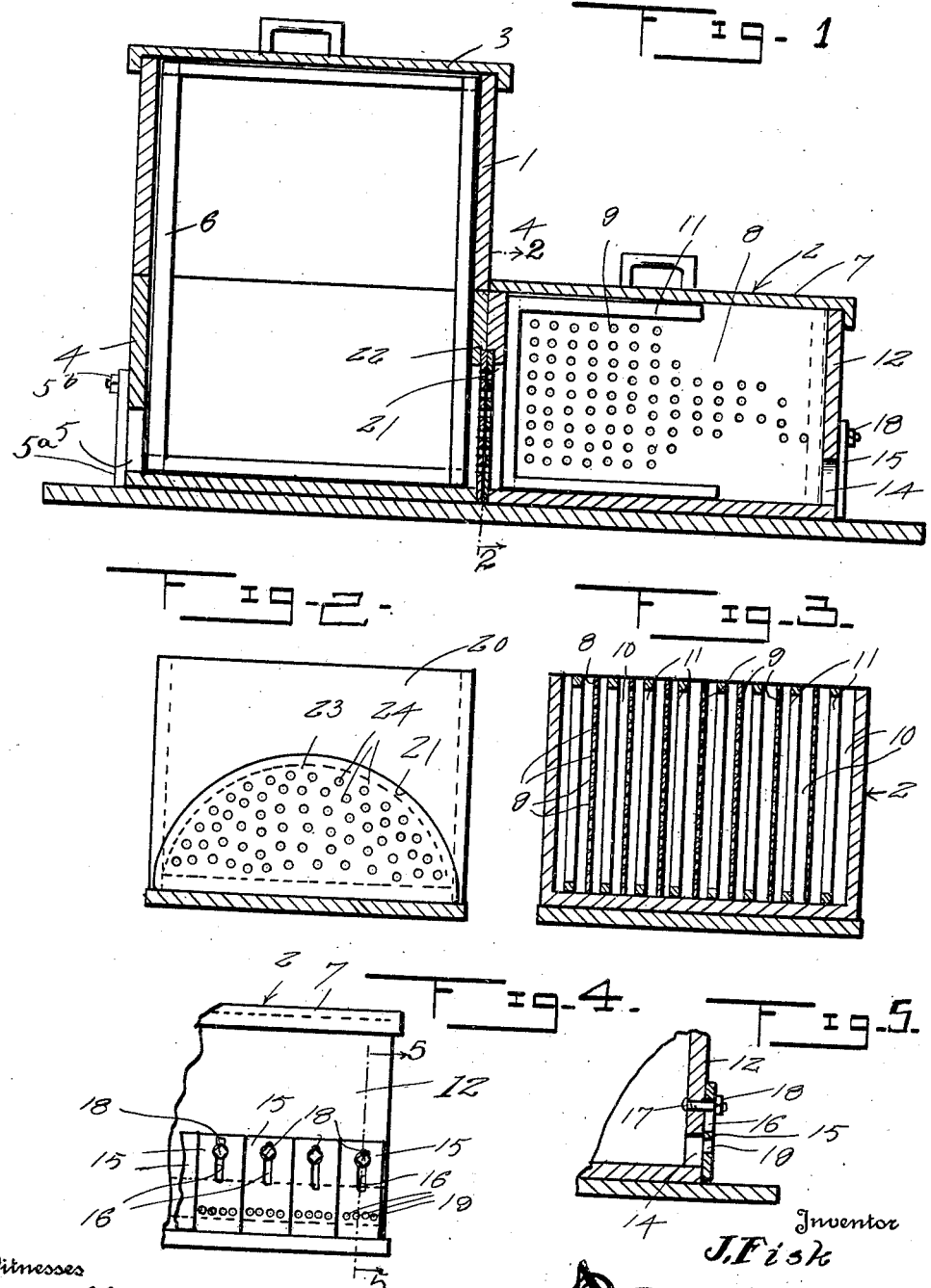

JAMES FISK, OF STRATFORD, CALIFORNIA.

BEEHIVE FOR RAISING QUEEN BEES.

1,341,364.  Specification of Letters Patent.  Patented May 25, 1920.

Application filed April 12, 1918. Serial No. 228,145.

*To all whom it may concern:*

Be it known that I, JAMES FISK, a citizen of the United States, residing at Stratford, in the county of Kings and State of California, have invented certain new and useful Improvements in Beehives for Raising Queen Bees; and I do hereby declare the following to be a full, clear, and exact description of the invention, such as will enable others skilled in the art to which it appertains to make and use the same.

This invention relates to bee hives, and its primary object is the provision of a device of this character which shall be especially adapted for raising queen bees and to that end the hive embodies a main or brooder chamber divided by partitions into minor or queen chambers. The main chamber is provided with an entrance to each minor or queen chamber to permit the queens to enter the chambers after fertilization, and with a gate for each entrance provided with perforations to permit the passage of worker bees when the gates are closed to keep the queens within the minor chambers.

The invention also embodies a super section abutting the main chamber, the adjacent walls of the super section and main chamber being perforated to permit the passage of the worker bees only from the minor chambers to the super section or from the super section to the minor chambers.

In the accompanying drawings:—

Figure 1 is a vertical section through the bee hive.

Fig. 2 is a section on the line 2—2 of Fig. 1.

Fig. 3 is a transverse section through the brood chambers.

Fig. 4 is a fragmentary end view of the brood portion of the bee hive illustrating the slidable gate, and Fig. 5 is a section on the line 5—5 of Fig. 4.

Referring more particularly to the drawings, 1 and 2 designate respectively the super section or surplus honey storing portion of the bee hive and the main chamber or brood portion.

The surplus honey portion 1 of the hive is constructed in the usual manner, having its upper end closed by a removable cover 3 and its outer end 4 provided with entrance openings 5 to permit the worker bees to pass into this portion of the hive. The entrance openings 5 are controlled by gates or doors $5^a$ slidably mounted upon bolts $5^b$.

The usual type of honey comb carrying frames 6 are positioned within the surplus honey storage portion 1 of the hive.

The brood portion 2 of the hive has its upper end closed by a removable cover 7. The covers 3 and 7 are provided to permit of the inspection of the interior of the respective portions of the hive.

The brood portion 2 of the hive structure is provided with a plurality of perforated partitions 8 mounted therein which divide this portion of the hive into a plurality of separate minor compartments as clearly shown in Fig. 3 of the drawings. The partitions 8 are provided with perforations 9 which are of sufficient size to permit passage of worker bees from one compartment to the other, but which are small enough to prevent the passage of queen bees or drones from one of the compartments into the other, and by the provision of these partitions, a number of queen bees may be kept in the brood compartment 2, and prevented from contact with each other by the partitions 8. The compartments 10, formed by the partitions 8 may have the usual type of frames 11 positioned therein for holding the brood comb.

The outer side 12 of the brood portion 2 of the hive is provided with openings 14 formed therein near its lower end, as is ordinary in the construction of bee hives to permit the passage of bees into and out of the hive. The openings 14 are large enough to permit the queen bees and drones to pass therethrough, for fertilization of the queens. However to prevent the escape of the queens after they have reëntered the various compartments 10, suitable gates or door structures 15 are provided. The gate or door structures 15 comprise panels, which are provided with slots 16, through which bolts 17 extend. The bolts 17 also extend through the side 12 of the portion 2 of the hive and nuts 18 are mounted upon the outer ends of the bolts 17 for clamping engagement with the panels 15 to hold them in adjusted positions. The gates or door structures 15 are provided with a plurality of openings 19 formed therein which are of sufficient size to permit the passage of worker bees therethrough, but which will prevent the passage of queens or drones therethrough.

After the queens have reëntered the various compartments, the door or gate structures are closed, or moved downwardly so that the openings 19 will aline with the opening 14 and thus the passage of the working bees into and out of the various compartments 10 is permitted, but the queens are prevented from leaving the various compartments of the hive. The gates or doors 5ª are the same as the gates or doors 15 in construction.

The inner or rear wall 20 of the brood portion 2 of the hive abuts the adjacent wall of the honey storage portion 1 of the hive and these two walls are provided with alining openings 21 and 22 respectively. Suitable panels 23 are mounted in the openings 21 and 22 and these panels are provided with alining openings or perforations 24. The perforations 24, like the perforations 9, are only of sufficient size to permit the passage of worker bees therethrough and they will prevent the passage of drones into the honey storage compartments 1, and prevent the consequent consumption of the honey as well as preventing the queen bees from entering the honey storage compartment 1.

The two sections, namely the sections 1 and 2 of the hive may be connected in any suitable manner, such as by hook and staple connections, not shown, this matter being left to the desires of the person manufacturing the hive.

In reducing the invention to practice, certain minor features of construction, combination and arrangement of parts may necessitate alterations to which the patentee is entitled provided such alterations are comprehended within the scope of what is claimed.

What is claimed is:

1. A hive for raising queen bees, comprising a main chamber divided by partitions into minor chambers, the partitions being perforated for the passage of worker bees but preventing the passage of the queens, a brood frame in each minor chamber, a super section abutting the main chamber and providing for the passage of the worker bees from each minor chamber, and a cover for the main chamber giving access to all of the minor chambers.

2. A hive for raising queen bees, comprising a main chamber divided by partitions into minor chambers, the partitions being perforated for the passage of worker bees but preventing the passage of the queens, the main chamber being provided with an entrance to each minor chamber, a gate for each entrance perforated for the passage of worker bees but preventing the passage of the queens, a brood frame in each minor chamber, a super section abutting the main chamber and providing for passage of the worker bees from each minor chamber, and a cover for the main chamber giving access to all of the minor chambers.

3. A hive for raising queen bees, comprising a main chamber divided by partitions into minor chambers, the partitions being perforated for the passage of worker bees but preventing the passage of the queens, a brooder frame in each minor chamber, a super section abutting the main chamber, the adjacent walls of the main chamber and super section being provided with registering perforations for the passage of the worker bees from each minor chamber, and a cover for the main chamber giving access to all of the minor chambers.

In testimony whereof I affix my signature in presence of two witnesses.

JAMES FISK.

Witnesses:
  L. L. FOLLETT,
  S. A. MACHE.